(12) United States Patent
Cooper

(10) Patent No.: US 6,474,766 B1
(45) Date of Patent: Nov. 5, 2002

(54) SYSTEM AND METHOD FOR COLOR DITHER MATRIX CREATION USING HUMAN-VISION-SYSTEM GRAY MATRIX WITH CLUSTER RADII

(75) Inventor: Ted J. Cooper, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/823,643

(22) Filed: Mar. 29, 2001

Related U.S. Application Data

(60) Provisional application No. 60/231,364, filed on Sep. 8, 2000, provisional application No. 60/231,031, filed on Sep. 8, 2000, and provisional application No. 60/231,432, filed on Sep. 8, 2000.

(51) Int. Cl.[7] ............................... B41J 2/205; B41J 2/21
(52) U.S. Cl. ........................................... 347/15; 347/43
(58) Field of Search ............................. 347/15, 251, 9, 347/43; 358/1.9

(56) References Cited

U.S. PATENT DOCUMENTS

| | | |
|---|---|---|
| 5,111,310 A | 5/1992 | Parker et al. |
| 5,323,247 A | 6/1994 | Parker et al. |
| 5,341,228 A | 8/1994 | Parker et al. |
| 5,477,305 A | 12/1995 | Parker et al. |
| 5,543,941 A | 8/1996 | Parker et al. |
| 5,708,518 A | 1/1998 | Parker et al. |
| 5,726,772 A | 3/1998 | Parker et al. |
| 6,134,024 A | * 10/2000 | Miura et al. .................. 358/1.9 |

OTHER PUBLICATIONS

"Recent Trends In Digital Halftoning", Paul A. Delabastita, R&D Mgr., Agfa–Gevaert N.V., Mortsel (Belgium), Imaging Sciences and Display Technologies, SPIE Proceedings vol. 2949, 21 pages, Editor(s): Jan Bares, Xerox Corp., Webster, NY, USA; Christopher T. Bartlett, GEC–Marconi Avionics Ltd., Barming, Maidstone Kent, United Kingdom; Paul A. Delabastita, Agfa–Gevaert NV, Mortsel, Belgium; Jose L. Encarnacao, Fraunhofer Institut fuer Graphische, Darmstadt, Germany; Nelson V. Tabiryan, Univ. of Central Florida, Orlando, FL, USA; Panos Trahanias, Univ. of Crete, Heraklion, Greece; Arthur R. Weeks, Univ. of Central Florida, Orlando, FL, USA. ISBN: O–8194–2353–X, 478 pages Published 1997, Meeting Date: Oct. 07 –Oct. 11, 1996, Berlin, Germany * Recent trends in digital halftoning (Paper #: 2949–35).

"Design of Minimum Visual Modulation Halftone Patterns", J. Sullivan, L. Ray, and R. Miller, IEEE Transactions on Systems, Man and Cybernetics, vol. 21, No. 1, Jan./Feb. 1991, pp. 33–38.

Book: Digital Color Halftoning by Henry R. Kang SPIE/IEEE series on Imaging Science & Engineering 1999.

"Recent Progress in Digital Halftoning", Reiner Eschbach, Xerox, Digital Imaging Technology Center, Previously published in Pan–Pacific Imaging Conference/Japan Hardcopy Proc., pp. 138–141, Jul. 1998.

* cited by examiner

*Primary Examiner*—Trinh Nguyen
(74) *Attorney, Agent, or Firm*—Blakely, Sokoloff, Taylor & Zafman LLP

(57) ABSTRACT

A system and method for creating dither matrices for printing in color. The disclosed method shows how to construct arrays for cyan, magenta, yellow, and black primary color printing for which only a single calculation using the cost function is involved. The disclosed method computes only a single dither array. Once the first array is generated, the computer software program creates the other arrays by translating points of the original array to corresponding points in the secondary array. In one embodiment translation is performed using a random number generator. In alternate embodiments, translation is performed by inversion and shifting of the first array.

39 Claims, 16 Drawing Sheets

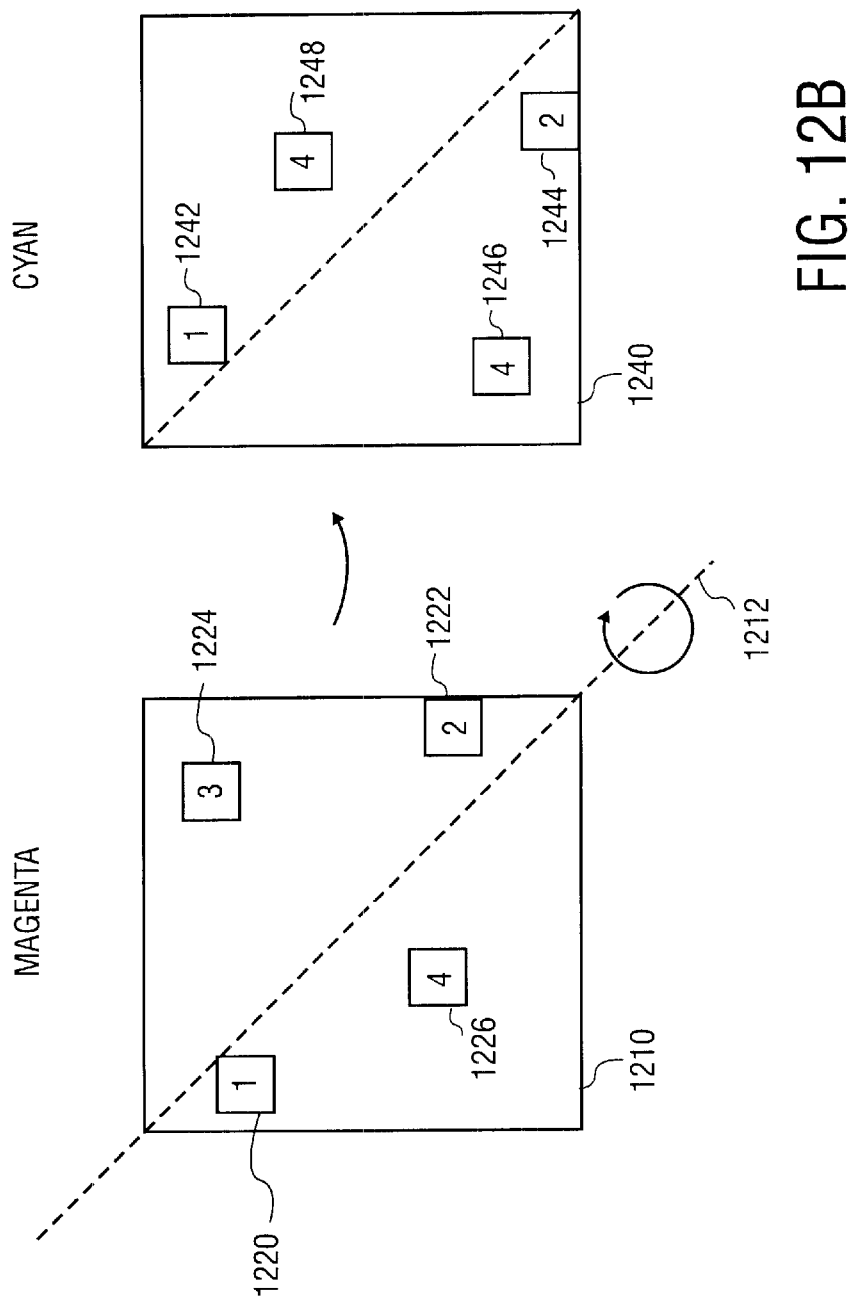

SYSTEM AND METHOD FOR COLOR DITHER MATRIX CREATION USING HUMAN-VISION-SYSTEM GRAY MATRIX WITH CLUSTER RADII

CROSS-REFERENCE TO RELATED APPLICATIONS

This application claims the benefit of the filing date of U.S. provisional patent application, entitled "Color Dither Matrix Creation Using HVS Gray Matrix with Inversion Technology", Ser. No. 60/231,364, filed Sep. 8, 2000, claims the benefit of the filing date of U.S. provisional patent application, entitled "Color Dither Matrix Creation Using HVS Gray Matrix with Cluster Radii", Ser. No. 60/231,031, filed Sep. 8, 2000, and further claims the benefit of the filing date of U.S. provisional patent application, entitled "Color Dither Matrix Creation Using HVS Gray Matrix with Multi-Cell Replacement", Ser. No. 60/231,432, filed Sep. 8, 2000.

BACKGROUND OF THE INVENTION

1. Field of the Invention

The present invention relates to the field of halftone image production. In particular, the present invention relates to an apparatus and a method for creating a dither matrix in a less compute-intensive manner for use in a color printing environment.

2. Description of Related Art

The use of halftone patterns is required whenever printing graphics with traditional inks upon paper. Halftone techniques arose because the continuously varying gradations of gray scale and colors cannot be directly printed by offset, dot-matrix, ink-jet, and other printer technologies that utilize the deposition of constant-shaded dots of black or colored ink. A common early halftone technique utilized a uniform screen, as shown in FIG. 1. The segment of uniform screen 10 includes many cells, of which cell 12 is exemplary. Changing the density of gray scale using the uniform screen 10 may be performed by enlarging or shrinking the size of the ink dot corresponding to each cell. A light gray may be shown by making the ink dots relatively small in size. Conversely, a darker gray may be shown by making the ink dots relatively larger. The ink dot placed at a cell may be of any shape, with the square dots shown in FIG. 1 merely serving as examples.

The uniform screen 10 may be extended to cover an entire image. This is a simple process of uniformly extending the existing screen pattern, and requires no more than simple geometric calculations. However, the uniform screen 10 of FIG. 1 has certain visual drawbacks. The human visual system (HVS) is very sensitive at recognizing unintentional patterns, called artifacts, caused by the use of a halftone pattern. The HVS is most sensitive to slowly-varying in space ("low frequency") artifacts and much less sensitive to rapidly-varying in space ("high frequency") artifacts. The literature on the subject often characterizes the HVS as possessing a "low-pass filter". Additionally, the HVS is much more sensitive to patterns falling on a horizontal or vertical line. In the FIG. 1 example, the cells line up along line 14. Line 14 forms an angle of θ degrees from a horizontal line 16. It is well-known in the art that the HVS is least sensitive to artifacts when θ is around 45 degrees.

A better approach is illustrated in the dither pattern of FIG. 2. The dither pattern 20 includes a large number of cells, of which a typical one is cell 22. There are more blank spaces between the dots of dither pattern 20 so this would correspond to a light gray. More dots could be added for a darker shade of gray. The cells of dither pattern 20 have been arranged so that repetitive patterns, recognizable by the HVS, are minimized. It would appear on first glance that such a useful dither pattern 20 is "random", but a truly random pattern would include clumps of cells and also empty spaces. Hence the dither pattern 20 would more correctly be described as evenly but not regularly patterned.

The dither pattern 20 of FIG. 2 corresponds to a particular percentage of cells being selected for ink-dot placement. In order to allow for differing percentages of cells being selected, a related dither matrix to dither pattern 20 may be created. A dither matrix is a dither pattern with an ordering scheme for including cells depending upon the ratio of ink dots filled cells to total cells required. For clarity, a dither matrix 30 is shown in FIG. 3a with a limited number of cells. In practice, a much larger number of cells would be defined and used in a dither matrix. To create dither matrix 30 from dither pattern 20, each cell such as exemplary cell 22 may have associated with it a threshold value, selected from a sequence from 1 through A, where A is the total number of cells in a dither pattern. For example, the threshold value stored in ordered cell 32 is the number 13. This means that if the ratio of dark cells to total cells is 13/A, then a proper pattern is for the printer to place ink dots at all ordered cells with a threshold value of 13 or less.

In order to extend the dither matrix 30 to cover an entire image, dither matrix 30 is replicated and applied as tiles. In FIG. 3b a typical tiling scheme is illustrated. A replicated copy matrix 40 of dither matrix 30 is placed at locations in a grid 42 covering the size of the image required.

A useful dither pattern such as dither pattern 20 is not easily created. One method of creating such a useful dither pattern, well-known in the art, is to use the technique known as error diffusion. In this method, first a two dimensional transfer function $V_{ij}$ that models the perceived responsiveness to patterns of the HVS is created. $V_{ij}$ is called a modulation transfer function (MTF). Then, a two dimensional function $p_{ij}$ that describes the location of all the selected cells in a given dither pattern is defined. Finally, a cost function that approximates the amount of artifacts seen by a human, depending upon $V_{ij}$ and a given $p_{ij}$, is created. In one embodiment, the cost function $Cost(p_{ij})$ is given by Equation 1 below.

$$Cost(p_{ij}) = \sum_{i=1}^{N} \sum_{j=1}^{N} V^2 ij Pij P*ij \qquad \text{Equation 1}$$

where Pij is the discrete Fourier transform (DFT) of the given pattern $p_{ij}$.

One method of selecting the least-objectionable pattern $p_{ij}$ for use in a dither pattern is to evaluate the cost function for all such patterns $p_{ij}$, and then select one of the $p_{ij}$ corresponding to the minimum value of the cost function. This is not practicable. The number of such possible combinations $p_{ij}$ representing M cells selected in a dither pattern of N by N cells is $(N^2!)/M!(N^2-M)!$. This is an enormous number even for smaller dither patterns such as 32 by 32, and the number increases substantially for desired dither patterns of 256 by 256 or even 1024 by 1024 cells. Evaluating Equation 1 for such large numbers of candidate patterns is computationally intensive, and for all but the smallest sizes of dither patterns is impractical with reasonable amounts of computer resources.

An additional issue in printing colors with dither matrices, such as dither matrix 30, is that inks are transparent to varying degrees. If the same dither matrix were used for differing primary colors, such as cyan, magenta, and yellow, this would result in placing the different color's ink dots roughly on top of one another. Light would then have to pass through multiple layers of ink to reflect off the base paper sheet. Having light pass through such multiple layers may produce unwanted multiple internal reflections and other similar optical effects that will yield impure colors when viewed.

SUMMARY

A system and method for color printing is disclosed. In one embodiment, the method for color printing begins by printing a first primary color, usually cyan, with the aid of a previously generated dither matrix. The method continues by deriving a new dither matrix from the previously generated dither matrix by moving each position in the previously generated dither matrix a short random distance, thereby forming a corresponding position in the new dither matrix for printing another primary color, usually magenta. In an alternate embodiment, a new dither matrix is derived from the previously generated dither matrix by inverting the positions in the previously generated dither matrix to the positions of the new dither matrix. In other embodiments, additional dither matrices may be derived by a process of shifting the previously generated dither matrix horizontally or vertically and wrapping around the edges of the original dither matrix. Additional new dither matrices may be created in a similar manner for use in printing other primary colors or black.

BRIEF DESCRIPTION OF THE DRAWINGS

The features, aspects, and advantages of the present invention will become more fully apparent from the following detailed description, appended claims, and accompanying drawings in which:

FIGS. 12a and 12b illustrate alternate embodiments of an inversion process of the present invention.

DETAILED DESCRIPTION

In the following description, numerous specific details are set forth to provide a thorough understanding of the present invention. However, one having an ordinary skill in the art will be able to practice the invention without these specific details. In some instances, well-known circuits, structures, and techniques have not been shown in detail to not unnecessarily obscure the present invention.

The present invention describes how to create dither matrices for printing in color, using a previously generated matrix, array or pattern to create dither matrices and, avoiding intense computations typically incurred in the generation of dither matrices.

Figure 4A:
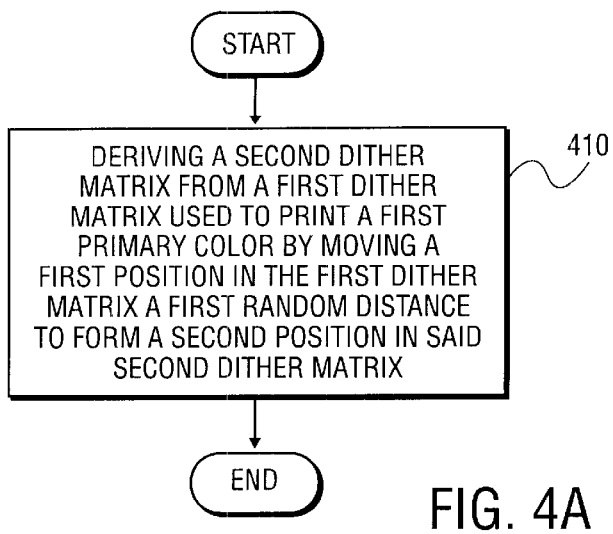
FIGS. 4a and 4b illustrate flow charts of embodiments of the method of the present invention.

One embodiment is illustrated in FIG. 4a, step 410, a second dither matrix for a second color is derived from a first dither matrix used to print a first color by moving a first position in the first dither matrix a first random distance to form a second position in said second dither matrix. Additional matrices, for example, for a third and fourth color, may be similarly derived.

Figure 4B:
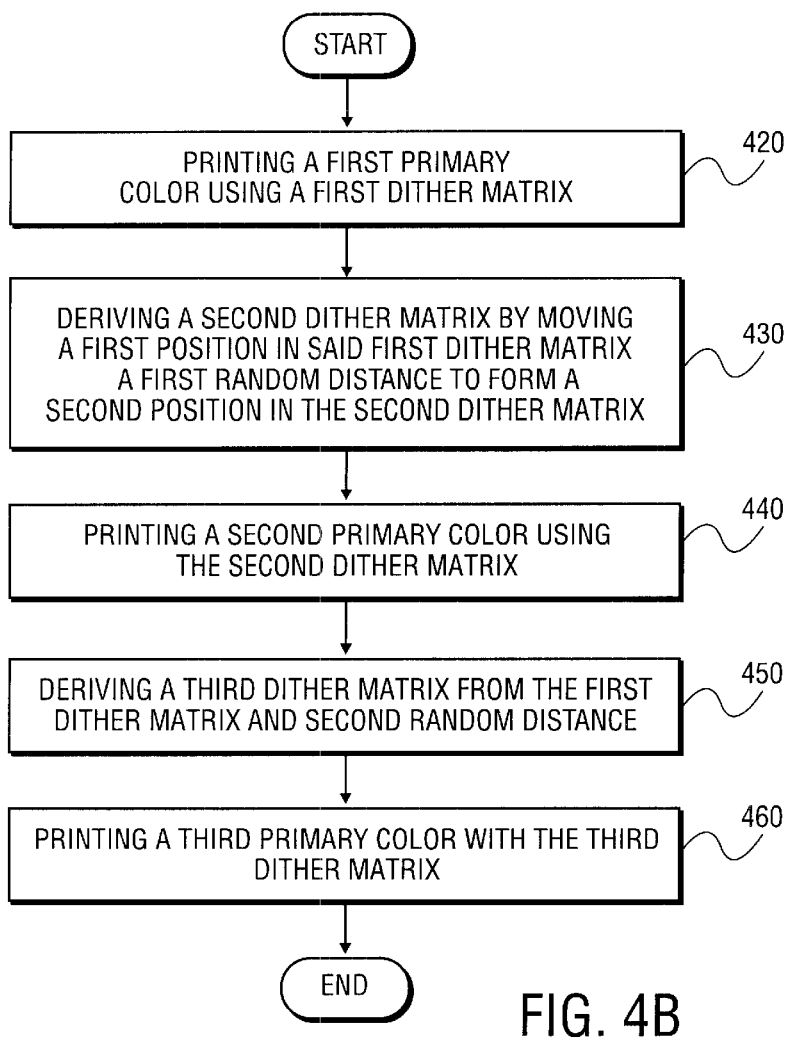

One embodiment for printing using multiple dither matrices generated for multiple colors in accordance with the teachings of the present invention is illustrated in the simplified flow diagram of FIG. 4b. At step 420, a first primary color is printed using a first dither matrix. At step 430, a second dither matrix is determined from the first dither matrix by moving a first position in the first dither matrix a first random distance to form a second position in the second dither matrix. At step 440, a second primary color is printed using the second dither matrix. At step 450, a third matrix is similarly derived from the first dither matrix by moving a first position in the first dither matrix a second random distance and at step 460 a third primary color is printed using the third dither matrix.

In one embodiment, to achieve the highest quality printed output, the dots of the colors such as primary colors cyan, magenta, yellow (CMY), and black (CMYK), should be close enough to each other to be within 1 or 2 units of visual acuity. Attempts to use different dither arrays (whether blue noise masking (BNM) or error diffusion) all exhibit artifacts for smoothly changing colors. Each of the dots of the CMYK primaries should be close to one another, yet not overlapping, if at all possible in order to give the best color fusion and still have the inks show their best color against the paper medium. Matrices can be constructed with a well known human vision system (HVS) model properties, but for which only a single calculation using the cost function is involved.

In one embodiment, the present invention computes only a single gray-type BNM dither array, but then employs properties of the HVS to quickly generate the arrays for the other colors. Once the first array is generated, the computer software program creates the other two (for CMY applications) or three (for CMYK applications) arrays by making identical copies of the first array. Then for each successive point of the original array, the corresponding point in the secondary array is moved in a radial method away from its current position in accordance with a number, such as a random number. Preferably, the random number is used construct a radius that is no greater than twice the visual acuity at a given viewing distance. This is done to ensure that the C from the original array is within the human color fusion radius with respect to the M, Y, and potentially K, colors if they have the same threshold values.

Since the secondary arrays have a random offset, such as a radial offset, from the original array, the colored dots will not lie upon one another in the lower ink density threshold values. This may be further ensured by making a database for each of the secondary arrays. The database simply lists if the current geometric position in that secondary array has been used. If it has, then another radial random number is generated to place the dot at a new position. If the new position is also taken, the process continues until a position not already taken is found. In certain instances where high threshold values are involved, this may entail increasing the radius for the random number generation process beyond two units of visual acuity.

Eventually, all the positions of the secondary arrays are filled. For the vast majority of the positions, a position's threshold value lies very close to the same threshold value in the primary array. This means smooth color gradations will have their colored primary dots laying very close together. For those threshold values that required the secondary arrays to move to a larger radii, the colors should either be dark enough or saturated enough that human perception will not notice the separation in the dots.

A variation of this invention is to add the requirement, when searching the database for an available empty hole to place the dot, to ensure that thresholds for slightly larger or smaller dots are kept as far away from each other as possible. This would separate the color dots in a smooth gradation as far as possible from each other. This in turn makes the gradation smooth and artifact-free since most artifacts in BMN array occur when dots are placed too close together and form visual patterns. By having the database also include the threshold level of the dot that occupies a space in the array, the search for an empty hole at a given radial position could choose the empty position that is as far way as permitted for a threshold that has a similar value.

In an alternate embodiment, the present invention makes use of the fact that cyan and magenta are the two dominant color primaries (not considering black). The yellow plane has the most pure inks and the human visual system sees the yellow plane the least. Once a single gray blue noise masking (BNM) dither matrix is created, it is then given over for use by the magenta color plane. This is because magenta inks are the most impure or contaminated with other primary colors. The cyan plane dither matrix may then be constructed by inverting the magenta dither matrix such that, for a coordinate system centered in the middle of the dither matrix, x is replaced by −x and y is replace by −y. So, for example, if a magenta ink dot appears in the upper left quadrant for a given threshold level, then the corresponding cyan ink dot for the same threshold level would appear at the lower right quadrant as part of the final combined color planes image. This technique saves the printer from having to store a separate dither matrix for the cyan and magenta colors since simple addressing changes provide the magenta and cyan dither patterns from the same single gray BNM array.

The yellow plane, since it is the most imperceptible to the human eye, may be generated by shifting the single gray BNM array in a wrap-around manner to the left by one-half the dither size. This makes the center of the gray array to the extreme left side of the yellow array, the left edge of the gray array go to the middle of the new yellow array, and the right edge of the gray array abutting this left edge near the center of the yellow array. Since the gray BNM array is designed to be position independent, the shift with wrap-around should have the same visual properties.

A black plane, if needed may be constructed in the same manner as the yellow plane, except the shift of the original gray BNM array is performed towards the top of the array with wrap-around to the bottom of the array.

A change to the cost function of Equation 1 may be utilized. It has been assumed that the final gray BNM array is shift and inversion invariant since the pattern is supposed to be very close to "random" in nature. But when shifts and inversions of gray masks have been tried in the past, the edges show the breakdown of spatial invariance. This happens because of round off, and because of the angular dependence of the human visual system.

In one embodiment, the present invention modifies the environment of the cost function of Equation 1 in order to force the system to have a better invariance to shift and inversion operations. The size of the dither array is increased, in one embodiment by five units of visual acuity at the viewing resolution. For a 128 by 128 array at a viewing distance of 12 inches, this means the array needs to be increased to 141 by 141. The data in these extra positions represent the edges of the yellow and black planes that would fill the outer five units of visual acuity of the original 128 by 128 array. In other words, it represents the data from the new yellow array that was shifted from right to left with wrap-around, and it represents the data from the black array that was shifted from top to bottom with wrap-around. This addition to the original data array makes the cost function of Equation 1 sensitive to the edges of the array where transitions have been made. It may be noted that only a 128 by 128 array is created, but the cost function of that array was derived from the slightly larger array that considers the effects of adding any anomalies that would come from the edges of the shifted and inverted arrays. The edges of the original 128 by 128 array are the locations where such anomalies will appear when shifting and inverting are performed.

In summary, this invention creates a series of color primary dither arrays. However, it only needs to perform the computationally intensive operation once. The other arrays may be copies of the first array with a radial dithering of their position to ensure that dots with the same threshold do not lie directly upon each other. This method is very effective for light pastel type colors where very few colored dots are present.

Figure 5:
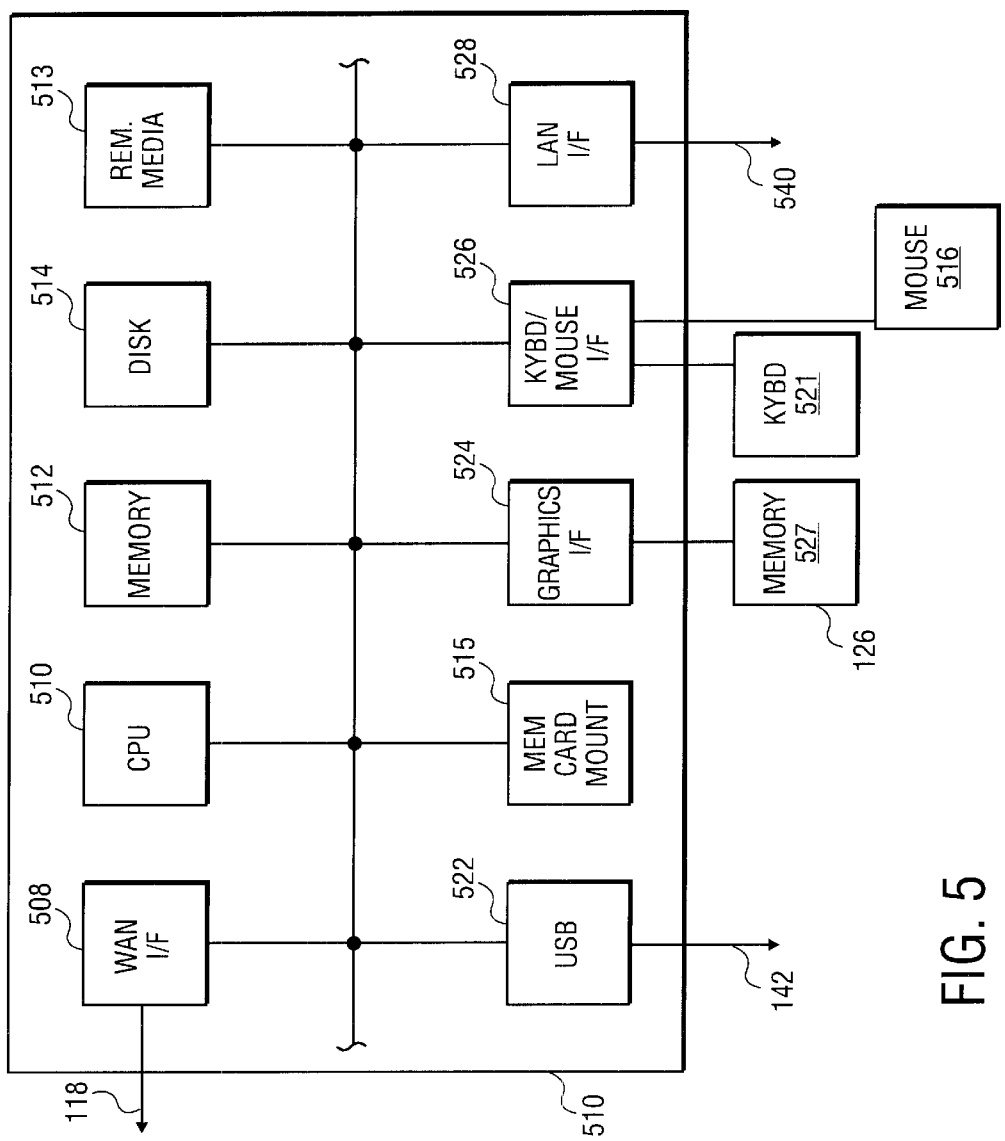
FIG. 5 is a block diagram of a computer system, according to one embodiment of the present invention.

Referring now to FIG. 5, a block diagram of a computer system is illustrated, according to one embodiment of the present invention. Personal computer 510 may include a WAN interface 508, a central processing unit (CPU) 510, a memory 512, a system disk 514, a removable media 513, a USB interface 522, a memory card mount 515, a graphics interface 524 supplying monitor 527, a keyboard/mouse interface 526 supplying keyboard 521 and mouse 516, and a local area network (LAN) interface 528. These functional units may be connected via a system bus 520. Memory 512 may include volatile random-access memory (RAM), programmable read-only memory (PROM), non-volatile Flash memory, or any other kind of memory. Removable media 513 may be a variety of media including a floppy disk, a removable magnetic disk, an optical or magneto-optical disk, semiconductor memory, or magnetic tape.

Figure 6:
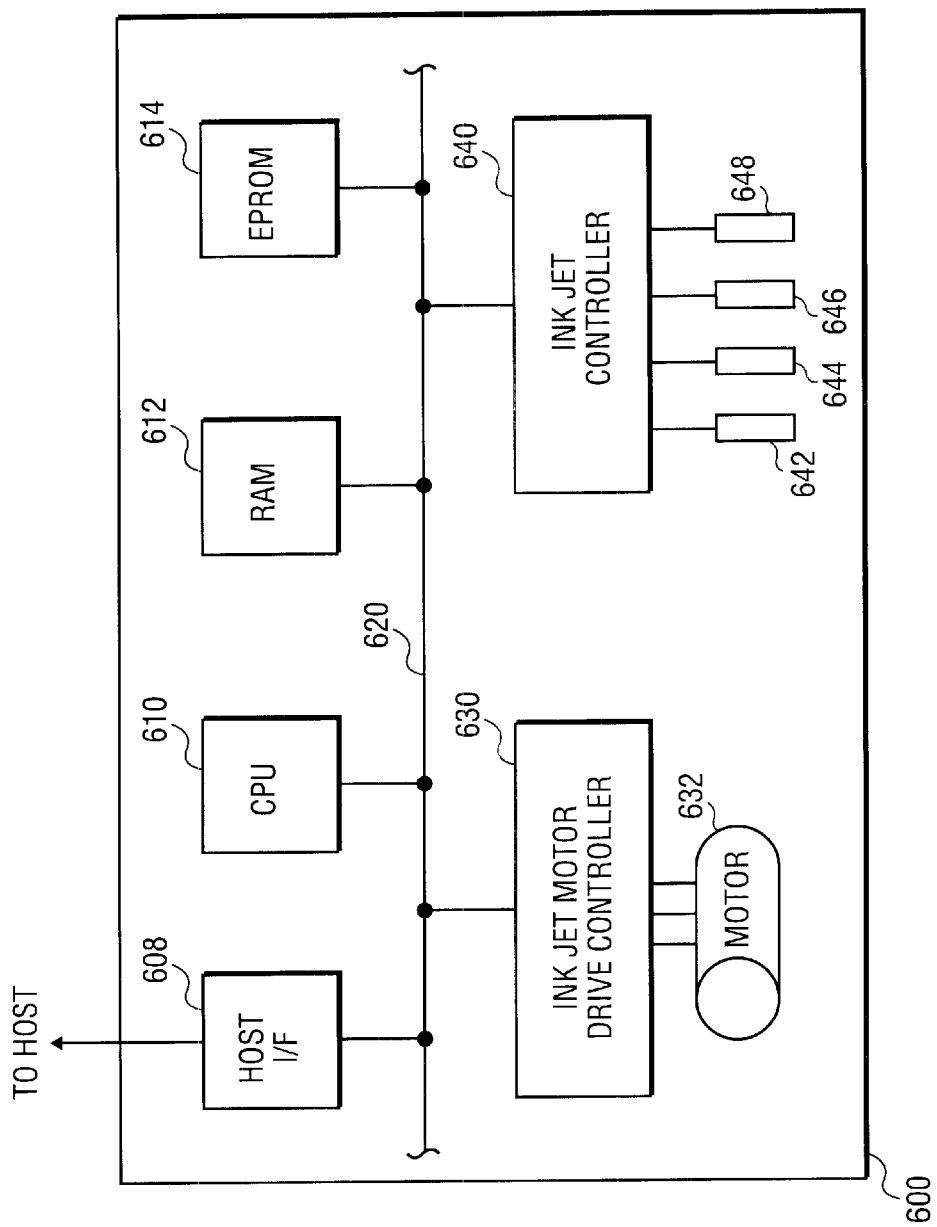
FIG. 6 is a block diagram of an ink-jet printer, according to one embodiment of the present invention.

Referring now to FIG. 6, a block diagram of an ink-jet printer 600 is shown, according to one embodiment of the present invention. Ink-jet printer 600 may include a host interface 608, a CPU 610, an amount of RAM 612, an amount of non-volatile erasable programmable read-only memory (EPROM) 614, an ink-jet motor drive controller 630 for controlling the operation of motor 632, and an in-jet controller 640 for controlling the operation of cyan jet 642, magenta jet 644, yellow jet 646, and black jet 648. These functional units may be connected via a system bus 620.

Figure 7:
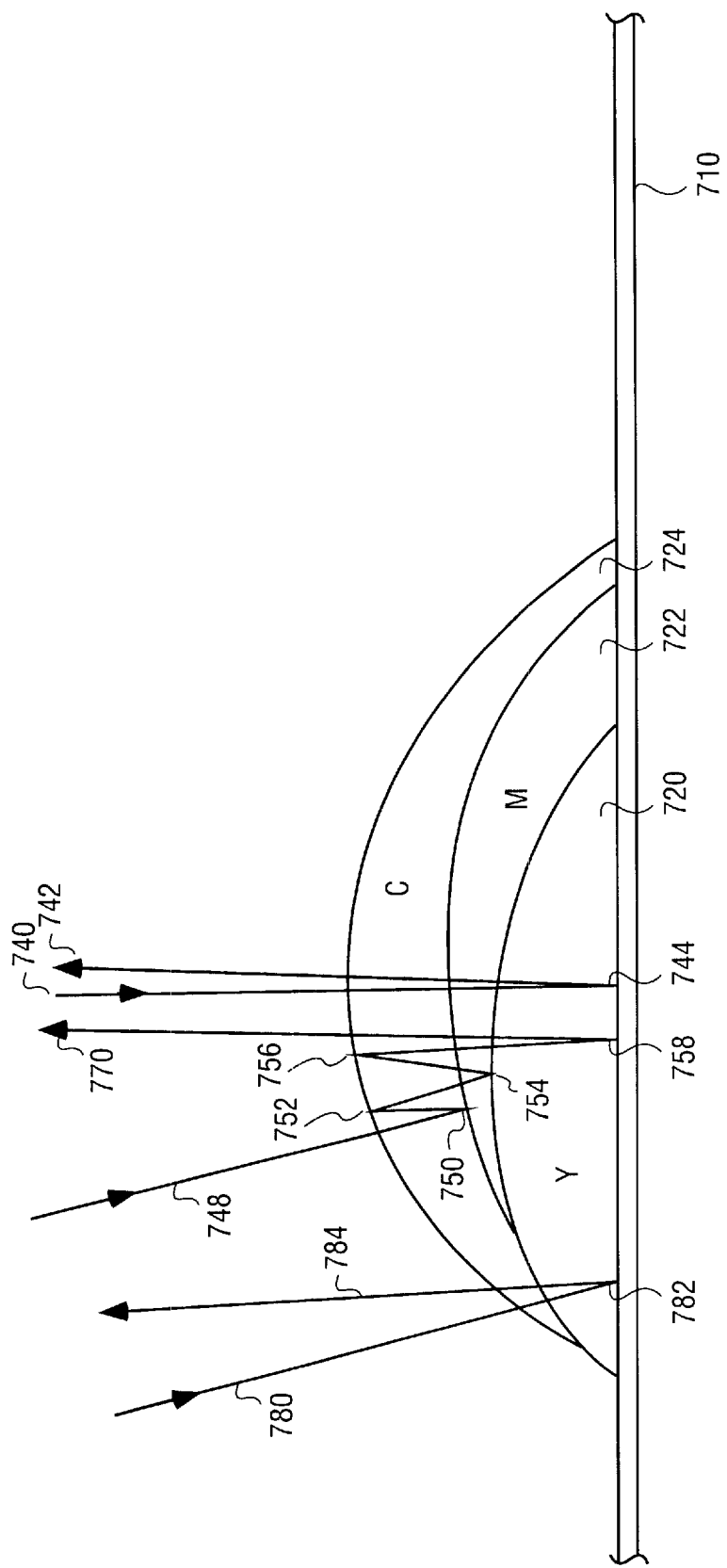
FIG. 7 illustrates light transmission through colored ink dots, according to an embodiment of the present invention.

Referring now to FIG. 7, light transmission through colored ink dots is illustrated, according to an embodiment of the present invention. If the same dither matrix was used for differing primary colors, such as cyan, magenta, and yellow, this would result in placing the different color's ink dots roughly on top of one another. Although the inks are transparent to varying degrees, light would have to pass through multiple layers of ink to reflect off the base paper sheet. In FIG. 7, three ink dots, cyan dot 724, magenta dot 722, and yellow dot 720, are placed as closely on top of one another as the tolerances of the ink-jet printer permit. If incident light on path 740 penetrates the three ink dots, it may reflect from base paper sheet 710 and return directly via path 742. Even this occurrence is non-optimal, since cyan and magenta inks transmit much less light than yellow ink. A more problematic light path is path 748. Here light reflects at the surface 750 of magenta dot 722, reflects back at the surface 752 of cyan dot 724, and makes several other reflections before exiting along path 770. Improper colors and scatter effects are the result of such a path.

Figure 8:
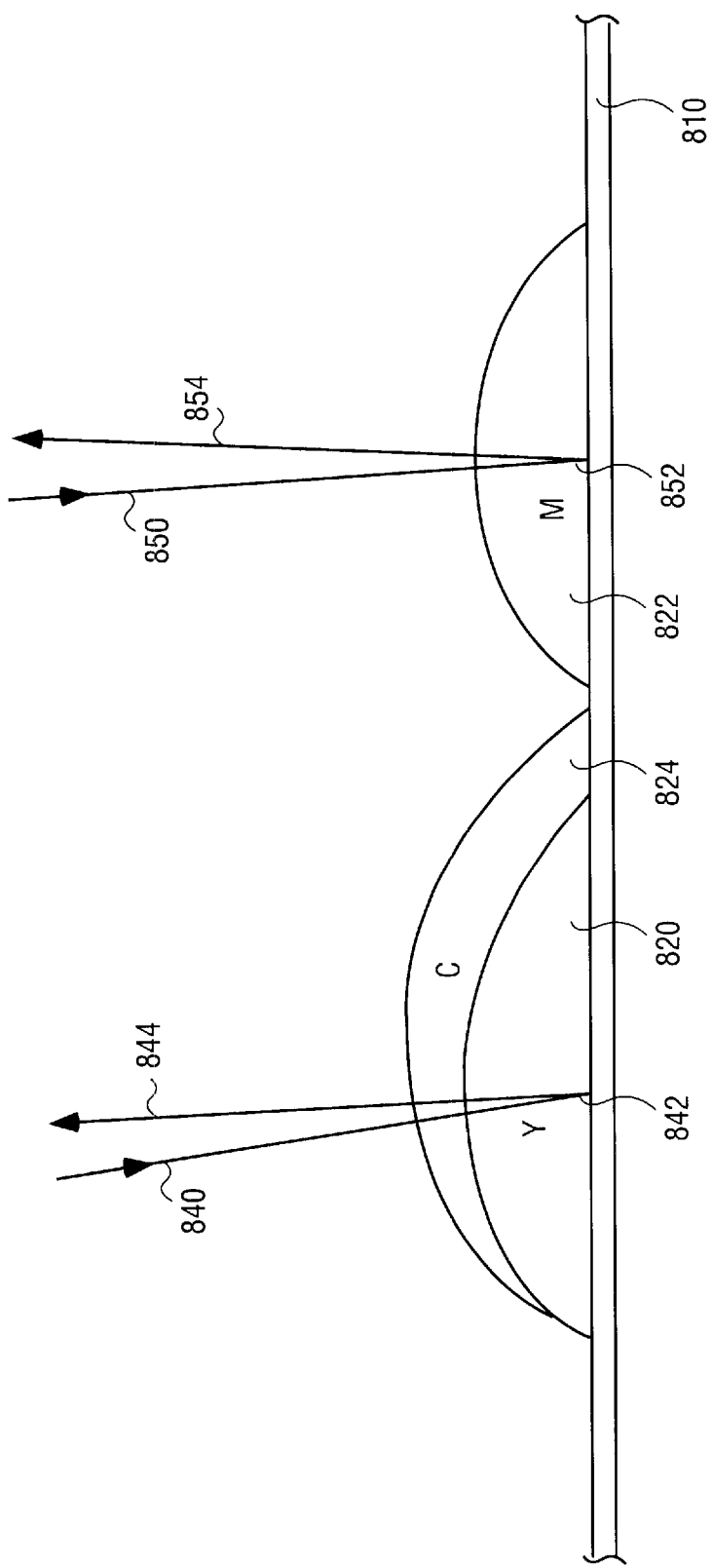
FIG. 8 illustrates light transmission through colored ink dots, according to an embodiment of the present invention.

Referring now to FIG. 8, light transmission through colored ink dots is illustrated, according to an embodiment of the present invention. In the FIG. 8, a dither matrix places cyan dot 842 next to but not overlapping magenta dot 822. Yellow dot 820 may be placed either under or over cyan dot 842 or magenta dot 822 because yellow ink transmits light much more readily than either cyan or magenta ink. The placing of cyan dot 824 to the side of magenta dot 822 produces much improved visual quality in comparison with the ink dot placement of FIG. 7.

Figure 9A:
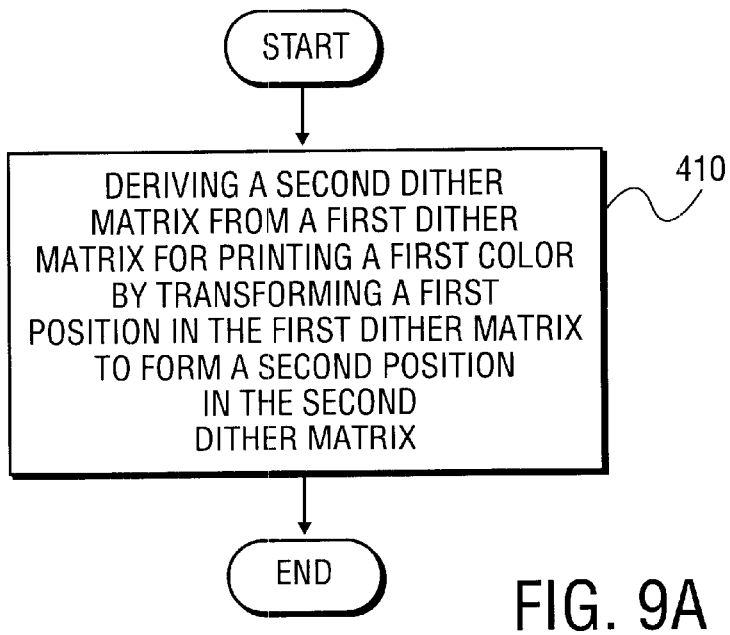
FIGS. 9a and 9b are flowcharts illustrating embodiments of the method of the present invention.

One embodiment of the process of the present invention is illustrated in FIG. 9a. A second dither matrix is formed from a first dither matrix, for printing a first color, by transforming a first position in the first dither matrix to form a second position in the second dither matrix a second color, such as a second primary color, may be printed using the second dither matrix, step 910. In one embodiment, the transformation process is an inversion process. Alternately, the transformation process is a shifting process.

Figure 9B:
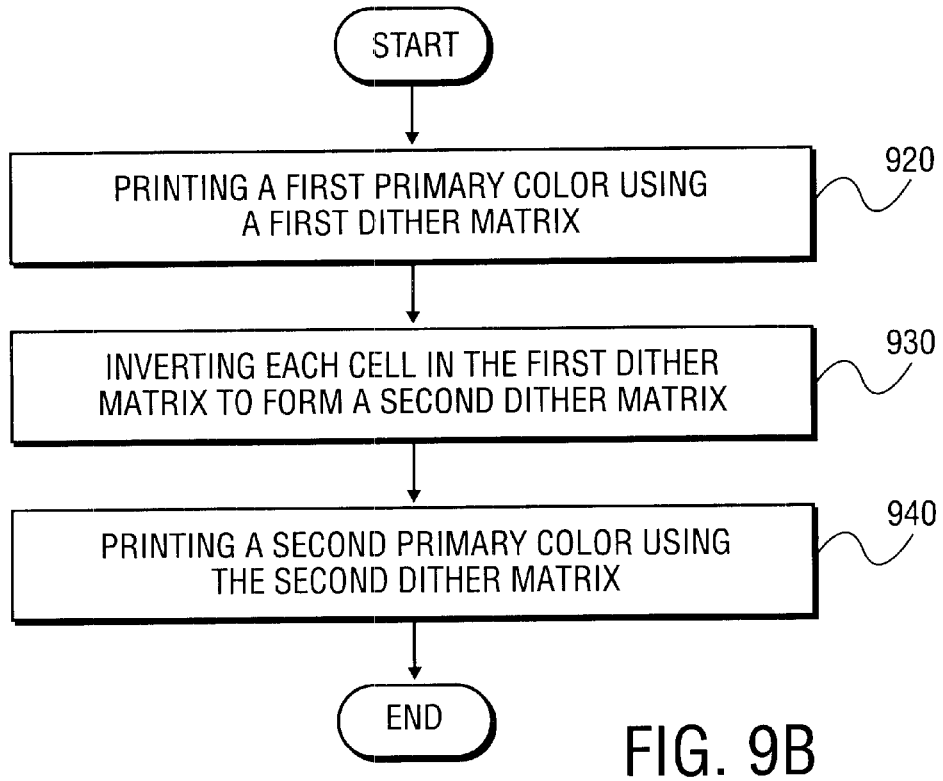

FIG. 9b shows an alternate embodiment. At step 920, a first primary color is printed using a first dither matrix. At step 930 each cell in the first dither matrix is inverted to form a second dither matrix. A second primary color is printed using the second dither matrix, step 940.

Figure 10:
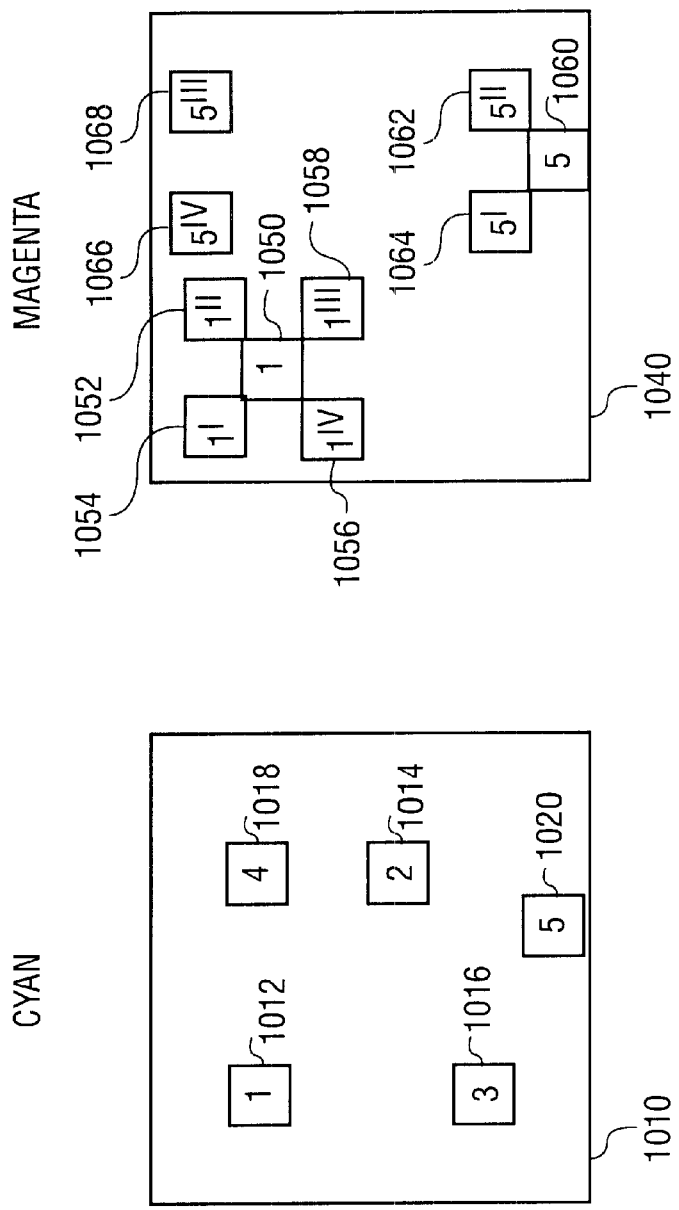
FIG. 10 illustrates alternate placement of colored ink dots in a dither matrix, according to one embodiment of the present invention.

Referring now to FIG. 10, alternate placement of colored ink dots in a dither matrix is illustrated, according to one embodiment of the present invention. Let dither matrix 1010 be a BNM dither matrix as described above. Dither matrix 1010 may be of any order, such as 32 by 32 or up to 1024 by 1024. In the FIG. 10 example, dither matrix 1010 has only 5 cells shown for the purpose of illustration, but in practical cases dither matrix 1010 will have many more cells.

In one embodiment, dither matrix 1010 is utilized as it is for the cyan ink dots. In other embodiments, dither matrix 1010 may be used for magenta ink dots. In order to prevent overlapping cyan and magenta dots, a new dither matrix 1040 derived from dither matrix 1010 is used. In order to determine the locations for placing a magenta ink dot in dither matrix 1040, a cyan ink dot location 1050 is identified. Then a new location, visually close to the cyan ink dot 1050, is determined for use with a corresponding magenta ink dot. For example, locations 1052, 1054, 1056, and 1058 are candidates for a magenta ink dot. They are close to location 1050 and on a line forming an approximately 45-degree angle or 135 degree angle from the edge of the matrix. This angle is the least-noticeable angle in the HVS. As long as locations 1052, 1054, 1056, and 1058 are within approximately 2 units of visual acuity, the HVS will integrate them and perceive the correct shading.

Sometimes the magenta ink dot may not be placed at a selected location in the set of locations 1052, 1054, 1056, and 1058 because of interference with an adjoining cell in the dither matrix 1040. Every time one of such locations as locations 1052, 1054, 1056, and 1058 are determined in the setting up of dither matrix 1040, they are placed into a database. In this manner it is possible to determine if one of locations 1052, 1054, 1056, and 1058 would interfere with an ink-dot location previously selected. In this case, a location selected from locations 1052, 1054, 1056, and 1058 should be used that does not coincide with any locations listed in the database. If all four of locations 1052, 1054, 1056, and 1058 coincide with a location listed in the database, the restriction on locations 1052, 1054, 1056, and 1058 to be within 2 units of visual acuity of base location 1050 may be relaxed. This permits placements of ink dots when a darker shade of gray or color is needed and there are therefore many ink dots that need to be placed in close proximity.

If a yellow ink dot is also indicated near location 1050, then one of locations 1052, 1054, 1056, and 1058 which was not utilized for a magenta ink dot may be used. Similarly, if a black ink dot is also indicated near location 1050, then one of locations 1052, 1054, 1056, and 1058 which was not utilized for a magenta ink dot or a yellow ink dot may be used. Any of these yellow ink dot or black ink dot locations may also be placed into the database to minimize overlapping of ink dots, as discussed above in connection with the magenta ink dots.

In some instances locations such as location 1060 are immediately adjacent to a boundary of dither matrix 1040. In this case the locations below location 1060 are not part of dither matrix 1040. For this reason, locations above location 1060, such as locations 1062 and 1064 are permitted to be adjacent to location 1060 as discussed above. However, locations that would be below the boundary line of dither matrix 1040 are wrapped-around to the top of dither matrix 1040 as shown by locations 1066 and 1068. Locations 1066 and 1068 for base location 1060 therefore correspond to locations 1056 and 1058 for base location 1050. Similar wrap-around locations may be used when at the left and right borders of dither matrix 1040.

Figure 11:
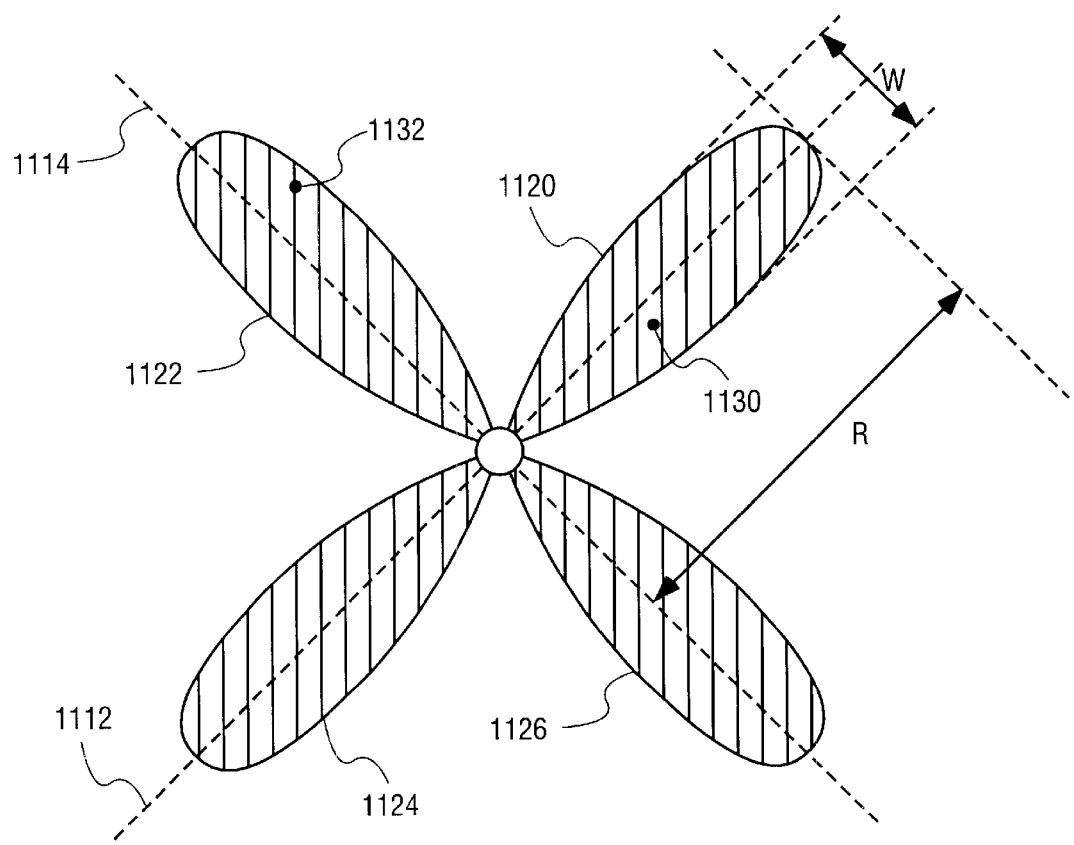
FIG. 11 illustrates a rho function, according to one embodiment of the present invention.

Referring now to FIG. 11, a rho function is illustrated, according to one embodiment of the present invention. A rho function is a mathematical construct for a two dimensional figure that yields a preferred area at certain displacements (for the human vision system, e.g., ±45 degrees with respect to the horizontal). A rho function such as shown in FIG. 11 may be utilized to compute candidate locations for ink dots as was discussed in connection with FIG. 10 above. The exact shape of the rho function may vary from one embodiment to another. The rho function permits randomly selecting locations that are within two units of visual acuity of a base location 1110 and that are also close to lying on a 45 degree axis 1112 or a 135 degree axis 1114 with respect to base location 1110. The radial distance R of each of the four lobes 1120, 1122, 1124, and 1126 is set to 2 units of visual acuity for the particular application of interest, which is dependent upon the distance from the image to the viewer's eye. The width W of each of the four lobes 1120, 1122, 1124, and 1126 is derived empirically. The area within the four lobes 1120, 1122, 1124, and 1126 forms the location of all candidate locations for placing the appropriate ink dot near but not coincident with base location 1110.

When using the rho function to place magenta ink dots as described in connection with FIG. 10 above, the printer must first determine if a cyan ink dot is indicated at base location 1110. If not, then the magenta ink dot may be placed at base location 1110. If a cyan ink dot is indicated, then the printer uses a random number generator to select a first random location 1130 within the lobes of the rho function. First random location 1130 is tested against the database of locations to see if it has already been used. If not, then a magenta ink dot may be placed at random location 1130. If random location 1130 has already been used, then the random number generator selects a second random location 1132. Second random location 1130 is tested against the database of locations to see if it has already been used. In this manner several random locations may be tested against the database of previously-selected locations in order to prevent ink dot overlapping.

After the cyan and magenta ink dots have been placed, the rho function may be used again to find locations for yellow and black ink dots in a similar manner.

Figure 12A:
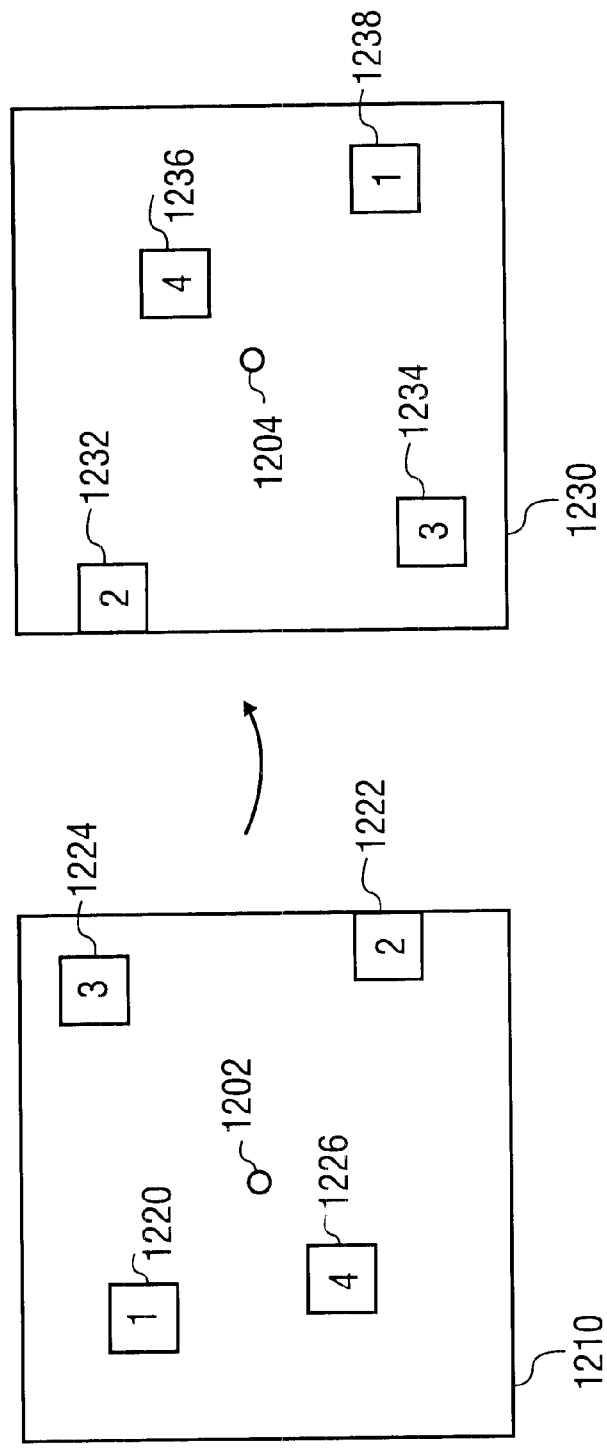

Referring now to FIGS. 12*a* and 12*b,* alternate placement of colored ink dots in a dither matrix by inversion is illustrated, according to one embodiment of the present invention. Dither matrix 1210 is a previously generated gray BNM dither matrix. In one embodiment, dither matrix 1210 may be used directly for printing magenta ink dots. In alternate embodiments, dither matrix 1210 may be used for cyan, yellow, or black ink dots.

In the FIG. 12*a* embodiment, the cyan dither matrix 1230 is created by one alternate embodiment of the inversion process. Dither matrix 1210 is inverted on axis 1212, forming dither matrix 1240. For each cell within dither matrix 1210, a corresponding cell in dither matrix 1230 is formed by reflection, a form of inversion, through the line of axis 1212. In other embodiments, other axis may be used for the process of inversion. For example, if the cell of location 1224 with threshold value 3 is inverted in this manner, it has a new location 1246 in dither matrix 1240. Similarly location 1220 in dither matrix 1210 is inverted to form location 1242 in dither matrix 1240. Once again, in this manner a new dither matrix 1240 is formed without extensive computational effort. New dither matrix 1240 may be used for cyan ink dots when dither matrix 1210 is used for magenta ink dots.

In the FIG. 12*b* embodiment, the cyan dither matrix 1230 is created by one embodiment of the process of inversion. Consider an origin 1202 for an x and y coordinate system within dither matrix 1210. Then for each cell within dither matrix 1210, replace the x coordinate by −x and replace the y coordinate by −y to form new dither matrix 1230 with origin 1204. For example, if the cell of location 1224 with threshold value 3 is inverted in this manner, it has a new location 1234 in dither matrix 1230. Similarly, location 1230 in dither matrix 1210 is inverted to form location 1238 in dither matrix 1230. In this manner a new dither matrix 1230 is formed without extensive computational effort. New dither matrix 1230 may be used for cyan ink dots when dither matrix 1210 is used for magenta ink dots.

Figure 13:
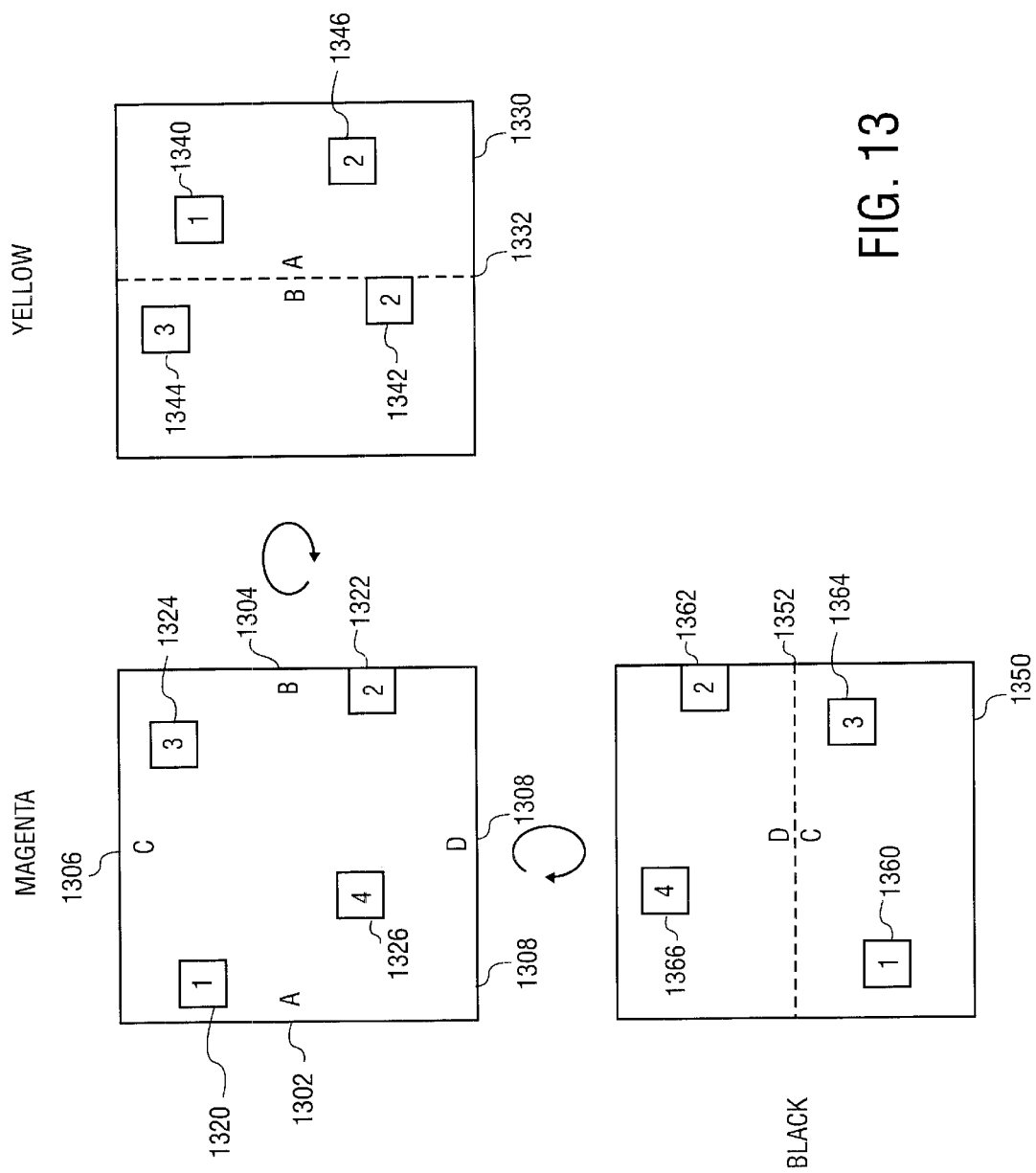
FIG. 13 illustrates an embodiment of alternate placement of ink dots.

Referring now to FIG. 13, alternate placement of colored ink dots in a dither matrix by shifting is illustrated, according to one embodiment of the present invention. Dither matrix 1310 may be used to form additional dither matrix 1330 and dither matrix 1350 by the process of shifting. In one embodiment, original dither matrix 1310 may be used for printing cyan or magenta, and additional dither matrices 1330, 1350 may be used for printing yellow or black.

In one embodiment, dither matrix 1310 is shifted to the right by one-half the width of dither matrix 1310, forming new dither matrix 1330. The left side A 1302 of dither matrix 1310 ends up at a midway line 1332 of dither matrix 1330. The right side B 1340 of dither matrix 1310 wraps around the left side and ends up abutting the midway line 1332 of dither matrix 1330. An exemplary location 1320 of dither matrix 1310 is shifted to the right side of dither matrix 1330 to become shifted location 1340. Similarly, an exemplary location 1324 in the right side of dither matrix 1310 is wrapped around and becomes shifted location 1344 on the left side of dither matrix 1330. In this manner a new dither matrix 1330 is formed without extensive computations being required. In alternate embodiments, the amount of shifting to the right or left may be different amounts than one-half the width of original dither matrix 1310.

In one embodiment, dither matrix 1310 is shifted down by one-half the height of the dither matrix 1310, forming new dither matrix 1350. The top side C 1306 of dither matrix 1310 ends up at a midway line 1352 of dither matrix 1350. The bottom side D 1308 of dither matrix 1310 wraps around the top side and ends up abutting the midway line 1352 of dither matrix 1350. An exemplary location of 1320 in the upper half of dither matrix 1310 is shifted down in dither matrix 1330 to become shifted location 1360. Similarly, an exemplary location 1322 in the lower half of dither matrix 1310 is wrapped around and becomes shifted location 1362 in the upper half of dither matrix 1350. In this manner another new dither matrix 1350 is formed, again without extensive computations being required. In alternate embodiments, the amount of shifting up or down may be by different amounts than one-half the height of original dither matrix 1310.

Figure 1:
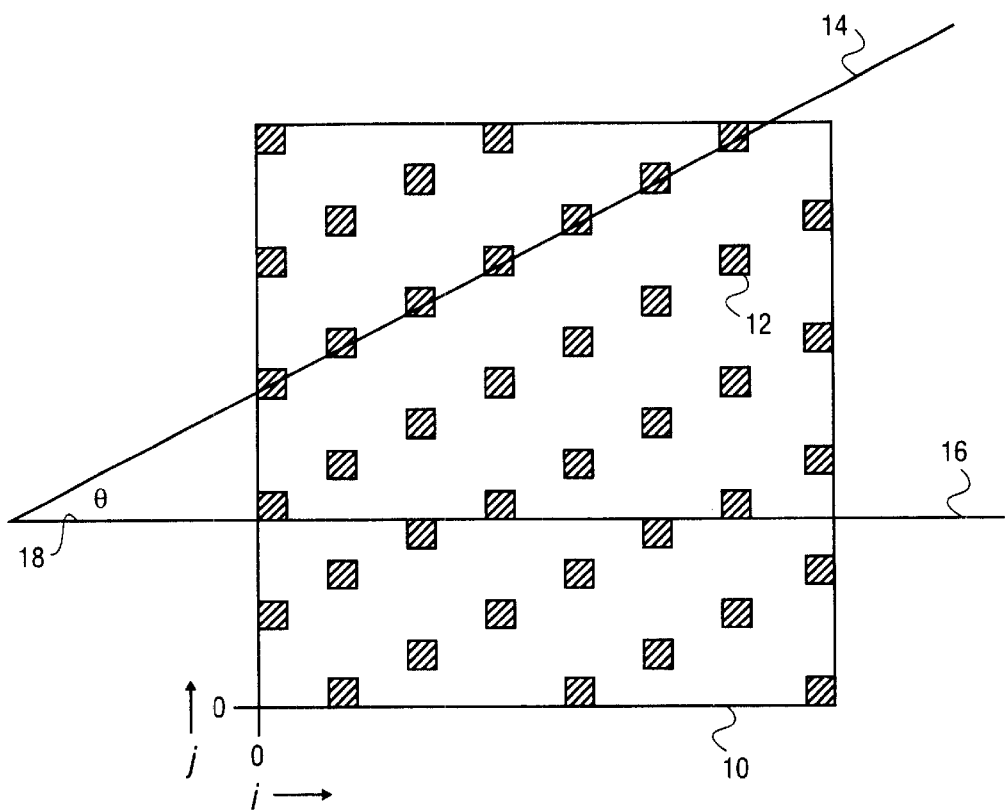
FIG. 1 is a diagram of a prior art fixed-grid halftone screen.
Figure 2:
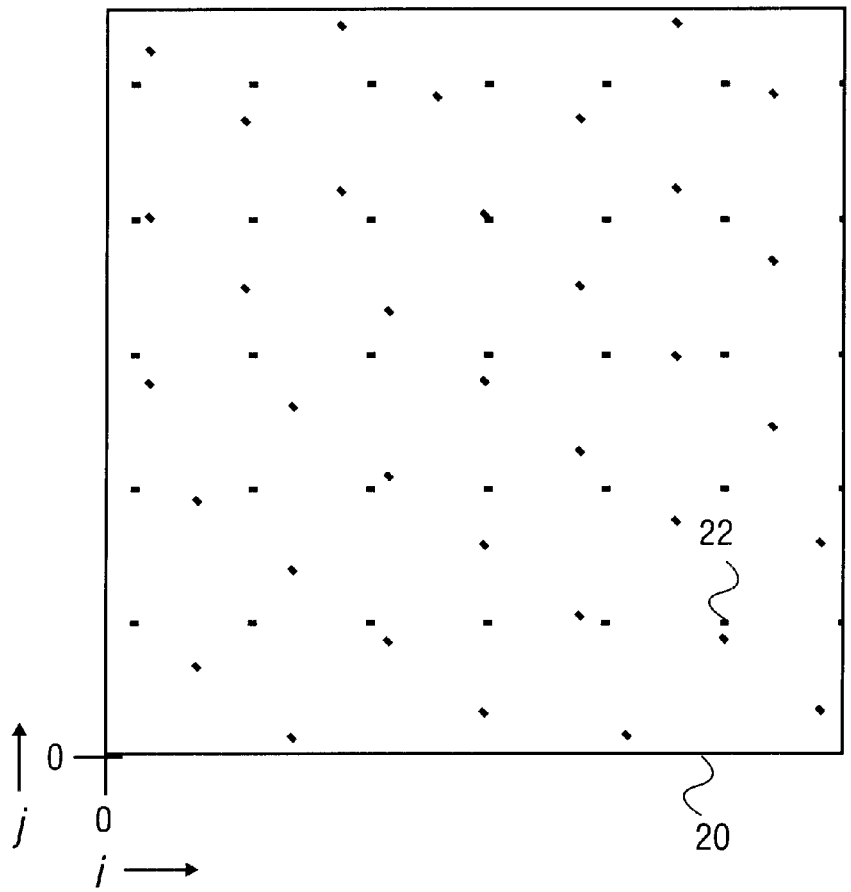
FIG. 2 is a diagram of a dither pattern.
Figure 3A:
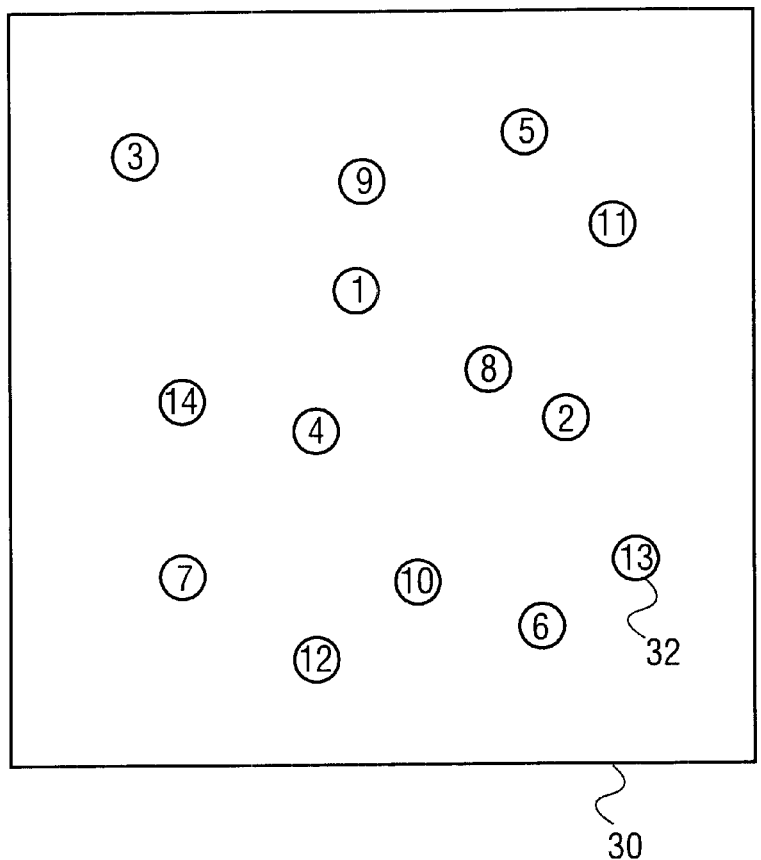
FIG. 3a is a diagram showing some of the elements of a dither matrix.
Figure 3B:
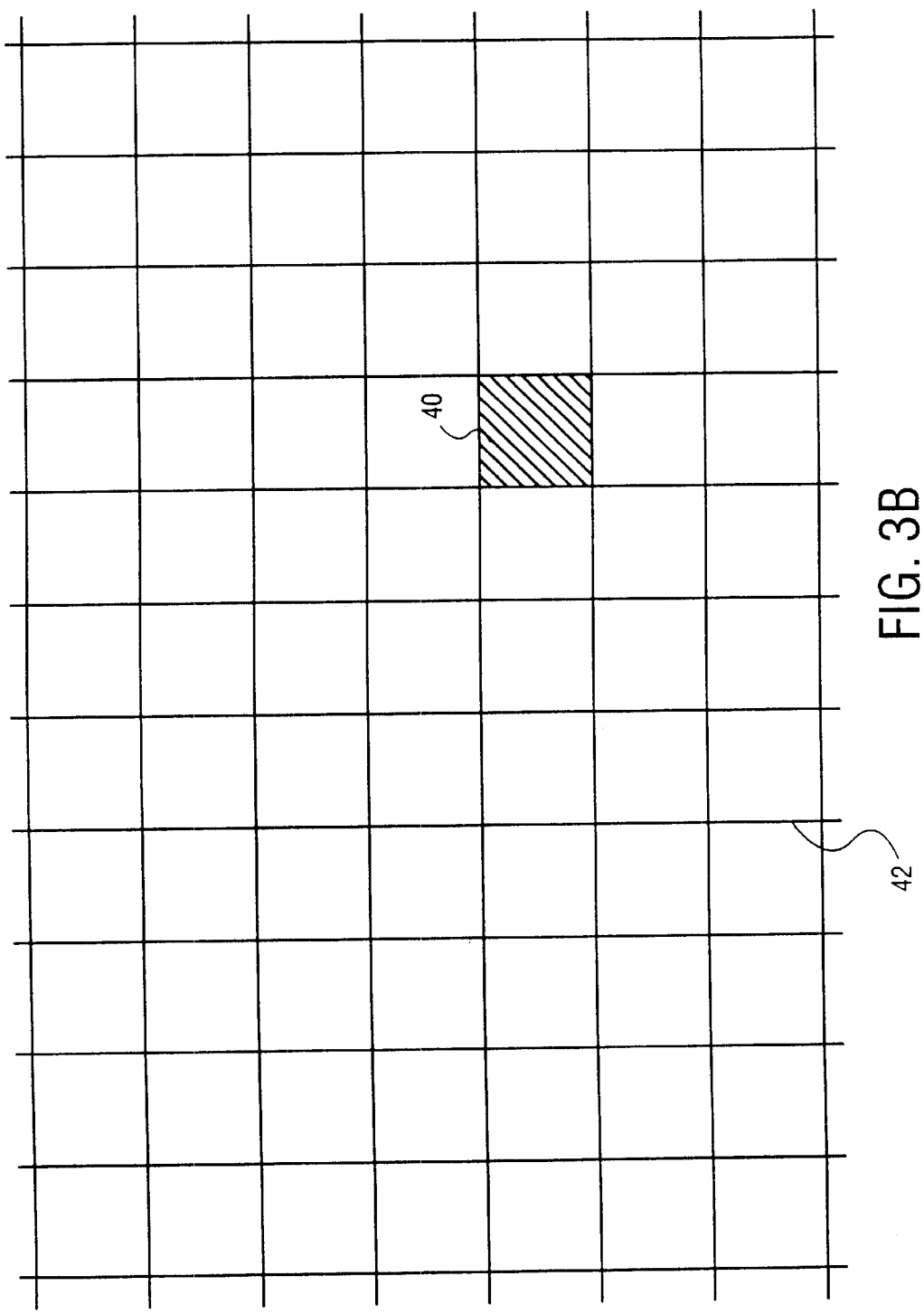
FIG. 3b is a diagram showing the embedding of the dither matrix of FIG. 3A into a larger image environment.
Figure 14:
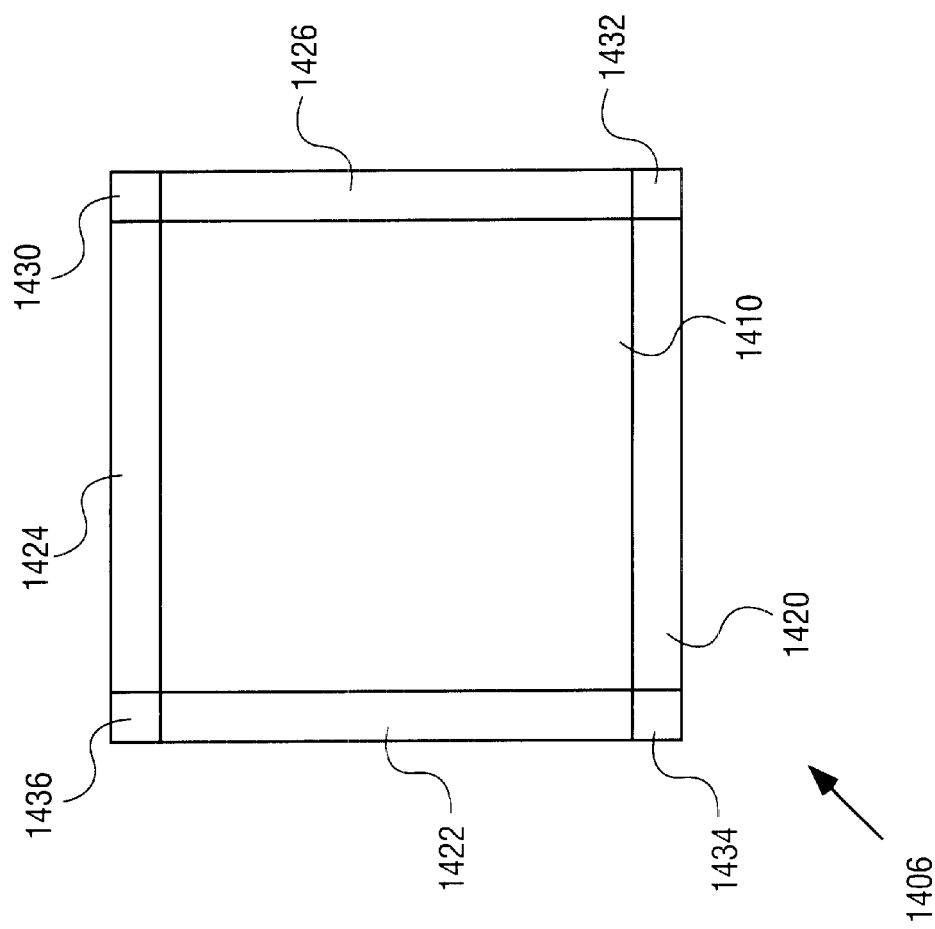
FIG. 14 illustrates a dither matrix that may be derived according to one embodiment of the present invention.

Referring now to FIG. 14, achieving greater transformation invariance by edge enhancement in a dither matrix is illustrated, according to one embodiment of the present invention. The present invention as discussed above may utilize a dither matrix created by any means as a starting point. However, best results are obtained when used in conjunction with a dither matrix of enhanced transformation invariance. In previous calculations for an original dither matrix, such as discussed above in the background of the invention section, the calculations of Equation 1 are carried out within the boundaries of the eventual dither matrix. An example of this is the dither matrix 30 of FIG. 3*a.* However, a dither matrix derived in this manner may not contain optimal transformation invariance because of the boundaries of the matrix.

Therefore, in one embodiment a dither matrix 1410 may be derived using a larger geometric overall area 1406 during the calculations of Equation 1. In the FIG. 14 embodiment, additional boundary areas 1420, 1422, 1424, and 1426 are conjoined to dither matrix 1410. Corner areas 1430, 1432, 1434, and 1436 are defined geometrically by the attachment of boundary areas 1420, 1422, 1424, and 1426 but are not used in the following calculations. The boundary areas 1420, 1422, 1424, and 1426 may have widths of approximately 2.5 units of visual acuity. As an example, when viewed at approximately 12 inches, if dither matrix 1410 is of size 128 by 128 positions, then each of boundary areas 1420, 1422, 1424, and 1426 may be 12.5 positions. The calculations of Equation 1 are performed on the overall area 1406, but may be omitted for corner areas 1430, 1432, 1434, and 1436. When a suitable minimum cost value is determined with respect to overall area 1406, the boundary areas 1420, 1422, 1424, and 1426, along with corner areas 1430, 1432, 1434, and 1436, may be stripped off and discarded. The remaining dither matrix 1410 will then possess enhanced transformational invariance, and therefore may give better results.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method for color printing, comprising:
    deriving a second dither matrix from a first dither matrix for printing a first color by transforming a first position in said first dither matrix to form a second position in said second dither matrix.
2. The method of claim 1, where transforming is selected from the group consisting of inverting, shifting, and moving a first random distance.
3. The method of claim 2, wherein said inverting includes inverting across an origin.
4. The method of claim 3, wherein said inverting across an origin. includes replacing an x coordinate of said first position with −x and a y coordinate of said first position with −y.
5. The method of claim 2, wherein said inverting includes reflecting across an axis.
6. The method of claim 5, wherein said axis forms an approximate 45-degree angle with a side of said first dither matrix.
7. The method of claim 2, further comprising deriving a third dither matrix from said first dither matrix by shifting, wherein said shifting is in a horizontal direction towards a first edge of said first dither matrix.
8. The method of claim 2, further comprising deriving a third dither matrix from said first dither matrix by shifting, wherein said shifting is in a vertical direction towards a third edge of said first dither matrix.
9. The method of claim 8, wherein said shifting includes wrapping around from said third edge to a fourth edge of said first dither matrix.
10. The method of claim 2, wherein said first random distance is within two units of visual acuity from said first position.
11. The method of claim 2, wherein said first random distance lies along a line forming an angle approximately at 45 degrees from a side of said first dither matrix.
12. The method of claim 2, wherein said first random distance is determined by a random number generator.
13. The method of claim 12, wherein said random number generator selects said second position within a boundary of a rho function.
14. The method of claim 13, wherein said rho function includes candidate locations within two units of visual acuity of said first position.
15. The method of claim 2, further comprising deriving a third dither matrix from said first dither matrix by moving said first position in said first dither matrix a fourth random distance to form a fourth position in said third dither matrix.
16. The method of claim 1, wherein said first color is magenta and said second color is cyan.
17. The method of claim 16, further comprising deriving a third dither matrix from said first dither matrix by transforming a third color with said third dither matrix.
18. The method of claim 17, wherein said shifting includes wrapping around from said first edge to a second edge of said first dither matrix.
19. The method of claim 17, wherein said third color is yellow.
20. The method of claim 1, wherein said first dither matrix is determined within a larger overall area including an area of said first dither matrix and a boundary area.
21. The method of claim 20, wherein said boundary area is approximately 2.5 units of visual acuity wide.
22. The method of claim 1, further comprising comparing said second location to a database of locations within said first dither matrix used in said printing said first color.
23. The method of claim 22, further comprising moving said first position a second random distance to form a third location if said second location matches an element of said database.
24. A system for color printing, comprising:
    a first dither matrix stored and used for printing a first color;
    a central processing unit to derive a second dither matrix from said
    first dither matrix by transforming a first position in said first dither matrix to form a second position in said second dither matrix; and
    the second dither matrix used for printing a second color.
25. The system as set form in claim 24, where transforming is selected from the group consisting of shifting, inverting, and moving a first random distance.
26. The system of claim 25, wherein said central processing unit performs inversions by coordinate inversions across an origin.
27. The system of claim 25, wherein said central processing unit performs inversions by reflecting about an axis forming an approximate 45 degree angle with a side of said first dither matrix.
28. The system of claim 25, wherein said central processing unit is also used to derive a third dither matrix from said first dither matrix by shifting, said system further comprising a third dither matrix used for printing a third color.
29. A system for color printing comprising:
    a first dither matrix used for printing a first color;
    a second dither matrix derived from the first dither matrix by
    transforming a first position in the first dither matrix to form a second position in the second dither matrix, said second dither matrix used for printing a second color.
30. The system set forth in claim 29, further comprising a third dither matrix derived from the first dither matrix by transforming a first position in the first dither matrix to form a third position in the third dither matrix, said third dither matrix used for printing a third color.
31. The system as set forth in claim 29, wherein transforming is selected from the group consisting of inverting, shifting, and moving a first random distance.
32. The system of claim 31, further comprising a random number generator to determine said second position within a boundary of a rho function.
33. The system of claim 31, further comprising a database of locations within said first dither matrix used in printing said first color.
34. The system of claim 33, wherein said central processing unit moves said first position a second random distance to form a third location if said second location matches an element of said database.
35. A computer readable medium comprising instructions, which when executed in a processing system perform a process for color printing comprising deriving a second dither matrix from a first dither matrix used for printing a first color by transforming a first position in said first dither matrix to form a second position in said second dither matrix.

36. The computer readable medium as set forth in claim 35, wherein inverting includes inverting across an origin.

37. The computer readable medium as set form in claim 35, wherein said inverting across an origin includes replacing an x coordinate of said first position with −x and a y coordinate of said first position with −y.

38. A system for color printing, comprising:

means for printing a first color with a first dither matrix;

means for deriving a second dither matrix from said first dither matrix by transforming a first position in said first dither matrix to form a second position in said second dither matrix; and means for printing a second color with said second dither matrix.

39. The system as set forth in claim 38, wherein transforming is selected from the group consisting of inverting, shifting, and moving a first random distance.

* * * * *